United States Patent
Rowe et al.

(10) Patent No.: US 7,173,810 B2
(45) Date of Patent: Feb. 6, 2007

(54) HORIZONTALLY MOUNTED POWER CIRCUIT BREAKER BUS ASSEMBLY

(75) Inventors: Neal Edward Rowe, Asheville, NC (US); Michael Howard Abrahamsen, Hendersonville, NC (US)

(73) Assignee: Eaton Corporation, Cleveland, OH (US)

( * ) Notice: Subject to any disclaimer, the term of this patent is extended or adjusted under 35 U.S.C. 154(b) by 55 days.

(21) Appl. No.: 11/082,488

(22) Filed: Mar. 17, 2005

(65) Prior Publication Data
US 2006/0209499 A1    Sep. 21, 2006

(51) Int. Cl.
*H02B 1/20* (2006.01)
*H02B 1/26* (2006.01)

(52) U.S. Cl. .............. 361/611; 361/624; 361/637; 361/652; 335/202; 174/68.2; 174/71 B

(58) Field of Classification Search .......... 361/611, 361/624, 634, 637, 639, 648–650, 652, 655–656, 361/673; 174/68.2, 70 B, 71 B, 72 B, 99 B, 174/149 B; 335/202
See application file for complete search history.

(56) References Cited

U.S. PATENT DOCUMENTS

| | | | | |
|---|---|---|---|---|
| 2,738,446 A | * | 3/1956 | Fleming | 361/650 |
| 2,997,627 A | * | 8/1961 | Ellegood | 361/614 |
| 3,293,503 A | * | 12/1966 | Davis et al. | 361/652 |
| 3,349,291 A | * | 10/1967 | Olashaw | 361/624 |
| 3,786,313 A | * | 1/1974 | Coles et al. | 361/644 |
| 4,307,304 A | * | 12/1981 | Kovatch et al. | 307/147 |
| 4,752,233 A | * | 6/1988 | Morby et al. | 439/212 |
| 4,789,344 A | * | 12/1988 | Fritsch et al. | 439/43 |
| 5,124,881 A | * | 6/1992 | Motoki | 361/605 |
| 6,043,439 A | | 3/2000 | Crooks et al. | |

* cited by examiner

*Primary Examiner*—Michael Datskovich
*Assistant Examiner*—Robert J. Hoffberg
(74) *Attorney, Agent, or Firm*—Martin J. Moran

(57) ABSTRACT

A bus assembly that is structured to be coupled to a multiple pole circuit breaker and to a plurality of horizontally aligned vertical line conductors is disclosed. The circuit breaker has a back side with a line terminal and a load terminal for each pole extending therefrom. At least two terminals are associated with different poles are vertically aligned. The bus assembly includes a first set of line buses structured to be coupled to the line terminals, and include at least one line bus having a horizontal offset, as well as a second set of load buses structured to be coupled to the load terminals and extending in a direction generally parallel to the load terminals.

20 Claims, 6 Drawing Sheets

HORIZONTALLY MOUNTED POWER CIRCUIT BREAKER BUS ASSEMBLY

BACKGROUND OF THE INVENTION

1. Field of the Invention

The present invention relates to a bus assembly for low voltage power switch gear circuit breakers and, more specifically, a bus assembly structured to allow circuit breakers that are traditionally mounted in a vertical orientation to be mounted in a horizontal orientation.

2. Background Information

Electrical power distribution centers typically utilize a plurality of low voltage power switch gear circuit breakers. Generally, the low voltage power switch gear circuit breakers have a non-conductive housing enclosing one or more sets of seperable contacts. The circuit breaker housing has a front side, with a control mechanism, a top side, a bottom side, two lateral sides, and a back side with, one or more pairs of line and load terminals extending therefrom. The line and load terminals are in electrical communication with the separable contacts. While a low voltage power switch gear circuit breaker may be used in any orientation, low voltage power switch gear circuit breakers traditionally have aligned terminals with each line terminal being disposed above the associated load terminal. Thus, the low voltage power switch gear circuit breaker is said to have a "top" side. Traditionally, the low voltage power switch gear circuit breakers in a power distribution center have been mounted vertically. That is, with one low voltage power switch gear circuit breaker top side being immediately adjacent to the next circuit breaker's bottom side.

Where the circuit breaker is a multi-pole circuit breaker, there is one set of terminals for each pole. Thus, in a three-pole circuit breaker, there are three line terminals and three load terminals, wherein each line terminal is associated with one load terminal. That is, each line terminal is electrically coupled to one of the load terminals through one set of separable contacts. Typically, the three line terminals are horizontally aligned and the three load terminals are horizontally aligned, with the load terminals being disposed below, and vertically aligned with, the associated line terminal.

Electricity was supplied to each low voltage power switch gear circuit breaker by a set of vertical conductors, or "vertical line conductors." The vertical line conductors, which are horizontally aligned, extended vertically behind a set of circuit breakers in the power distribution center. A bus member coupled each line terminal to a vertical line conductor. The load terminals were also coupled to a bus, however, the load buses extended generally straight, that is horizontally, back from the circuit breakers. If the vertical line conductors were aligned with the line terminals, the load buses included an offset that allowed the load buses to extend around the vertical line conductors. Conversely, if the load buses extended generally straight back from the circuit breakers, the vertical line conductors were disposed to the side of the line terminals and the line buses included an offset.

While the configuration described above is functional, there is a limit as to how many low voltage power switch gear circuit breakers may be disposed in a power distribution center. The number of low voltage power switch gear circuit breakers that may fit in a power distribution center is controlled by the height of the circuit breakers. It is further noted that, generally, a circuit breaker's height is greater than its width. Thus, a greater number of low voltage power switch gear circuit breakers could be disposed in a power distribution center if the circuit breakers could be mounted horizontally rather than vertically. To accomplish this, however, would require a bus assembly structured to couple the load terminals to the vertical line conductors while allowing the load terminals to extend past the vertical line conductors.

There is, therefore, a need for a bus assembly structured to couple a horizontally mounted circuit breaker to a set of vertical line conductors and having a set of horizontally extending load buses.

There is a further need for a bus assembly structured to couple a horizontally mounted circuit breaker to a set of vertical line conductors that is compatible with existing circuit breakers.

SUMMARY OF THE INVENTION

These needs, and others, are met by the present invention which provides a first set of line buses structured to be coupled to at least one line terminal and including at least one line bus having a horizontal offset, and a second set of load buses structured to be coupled to at least one load terminal and extending in a direction generally parallel to the load terminal. When a low voltage power switch gear circuit breaker is mounted horizontally, the line terminals, which in the normal orientation are horizontally aligned, are rotated about ninety degrees so that the line terminals are vertically aligned. Similarly, the load terminals, which in the normal orientation are horizontally aligned, are rotated about ninety degrees so that the load terminals are vertically aligned. Thus, in order to couple the vertically aligned line terminals with the horizontally aligned vertical line conductors, the bus assembly must compensate for the offset between at least two line terminals and two vertical line conductors. That is, at least two line buses must have a horizontal offset.

The vertical line conductors may be offset relative to the load terminals, thereby allowing the load buses to extend generally straight back from the circuit breaker. In another embodiment, the load buses are structured with a horizontal offset to more closely simulate the horizontally aligned load buses associated with a vertically mounted circuit breaker. The load buses may even include a vertical offset structured to bring the distal ends of the load buses into horizontal alignment.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As used herein, when components are said to be "vertically aligned," the components, when viewed from above or below, are aligned.

As used herein, when components are said to be "horizontally aligned," the components, when viewed from the side, are aligned.

As used herein, "circuit breaker" may be used as shortened form to describe a low voltage power switch gear circuit breaker.

Figure 1:
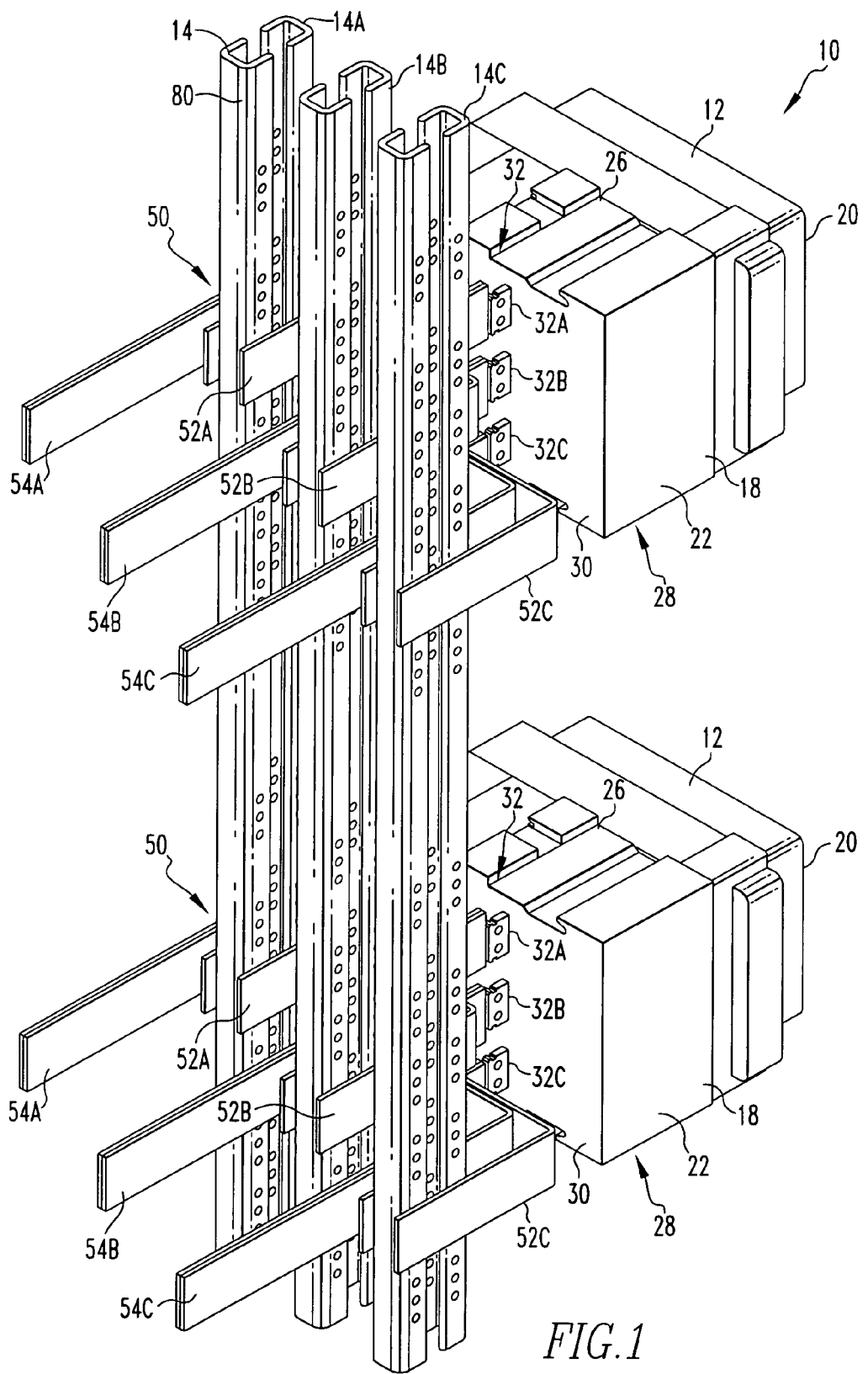
FIG. 1 is an isometric view of a power distribution center.
Figure 3:
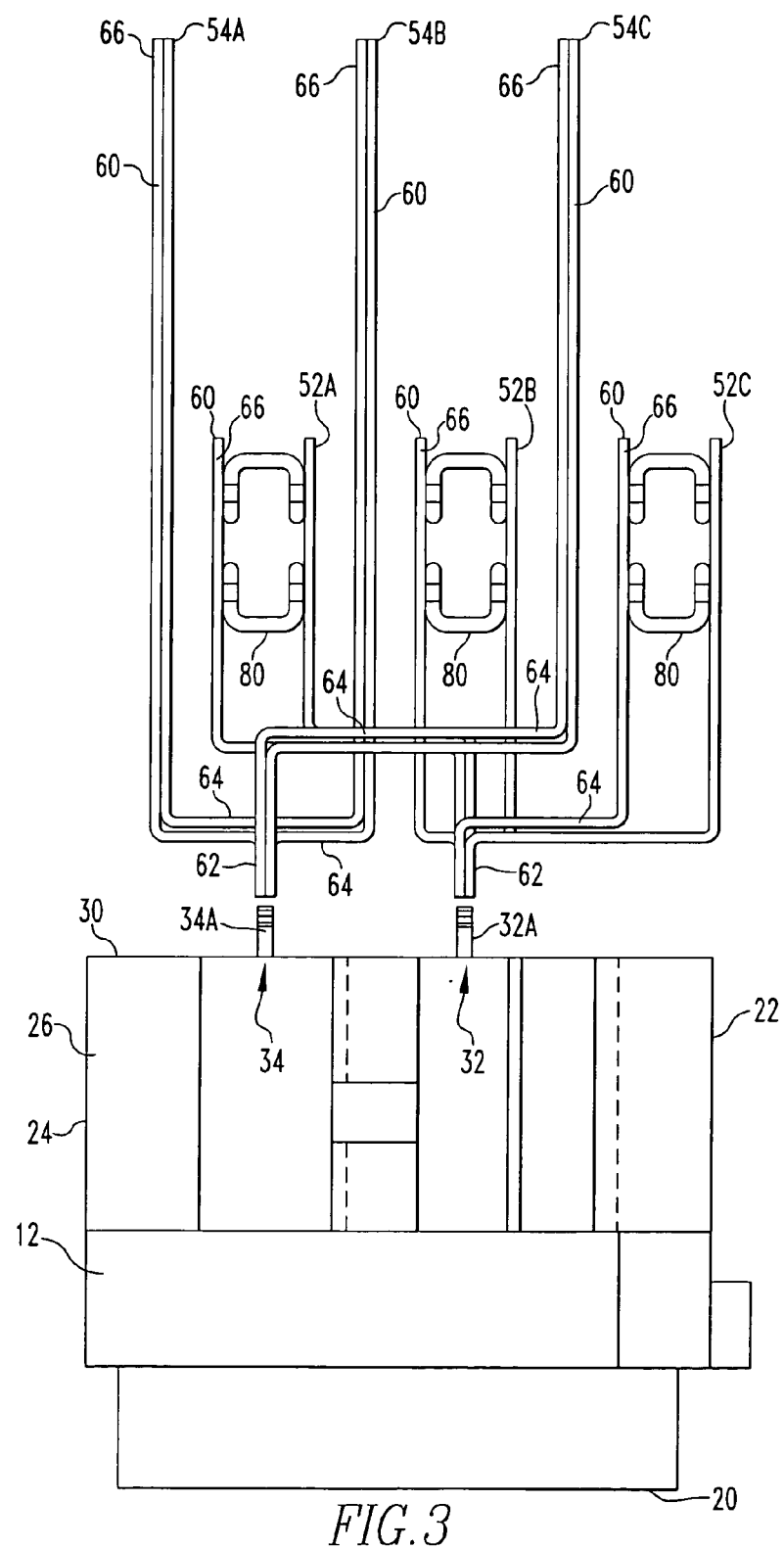
FIG. 3 is a top view of a single low voltage power switch gear circuit breaker in a power distribution center.

As shown in FIG. 1, a power distribution center 10 includes one or more low voltage power switch gear circuit breakers 12 (shown spaced for clarity) and a set of horizontally aligned vertical risers, or vertical line conductors 14. As shown, there are three vertical line conductors 14A, 14B, 14C. The power distribution center 10 further includes a housing assembly (not shown) that encloses the circuit breakers 12 and the set of vertical line conductors 14. The circuit breakers 12 each have a non-conductive housing 18 enclosing one or more sets of separable contacts (not shown). Each circuit breaker housing 18 has a front side 20 (FIG. 3), a top side 22, a bottom side 24, two lateral sides 26, 28, and a back side 30. The circuit breakers 12 are mounted horizontally, therefore the top side 22 is actually oriented as a lateral side. The back side 30 has one, or more, pair(s) of line and load terminals 32, 34 extending therefrom. As shown, and as discussed hereinafter, each circuit breaker 12 is a three-pole circuit breaker having three line terminals 32A, 32B, 32C and three load terminals 34A, 34B, 34C. It is understood, however, that the circuit breakers 12 may have any number of poles and pairs of terminals 32, 34. The line and load terminals 32, 34 are in electrical communication with the separable contacts. When a circuit breaker 12 is oriented horizontally, the line terminals 32A, 32B, 32C are vertically aligned. Similarly, when a circuit breaker 12 is oriented horizontally, the load terminals 34A, 34B, 34C are vertically aligned. Also, the associated pairs of line and load terminals 32, 34 are horizontally aligned. That is, the first pair of line and load terminals 32A, 34A are horizontally aligned, the second pair of line and load terminals 32B, 34B are horizontally aligned, and the third pair of line and load terminals 32C, 34C are horizontally aligned.

The bus assembly 50 includes a first set of line buses 52A, 52B, 52C structured to be coupled, one each, to the line terminals 32A, 32B, 32C, and a second set of load buses 54A, 54B, 54C structured to be coupled, one each, to the load terminals 34A, 34B, 34C. As shown best in FIG. 3, each line and load bus 52A, 52B, 52C, 54A, 54B, 54C is a conductive assembly 60 having a terminal end 62, a medial portion 64 and a conductor end 66. Each conductive assembly terminal end 62 is structured to be coupled, in electrical communication, with either a line terminal 32A, 32B, 32C or a load terminal 34A, 34B, 34C. Each conductive assembly conductor end 66 is structured to be coupled to a conductor, such as, but not limited to, a vertical line conductor 14A, 14B, 14C or a cable (not shown).

Figure 2:
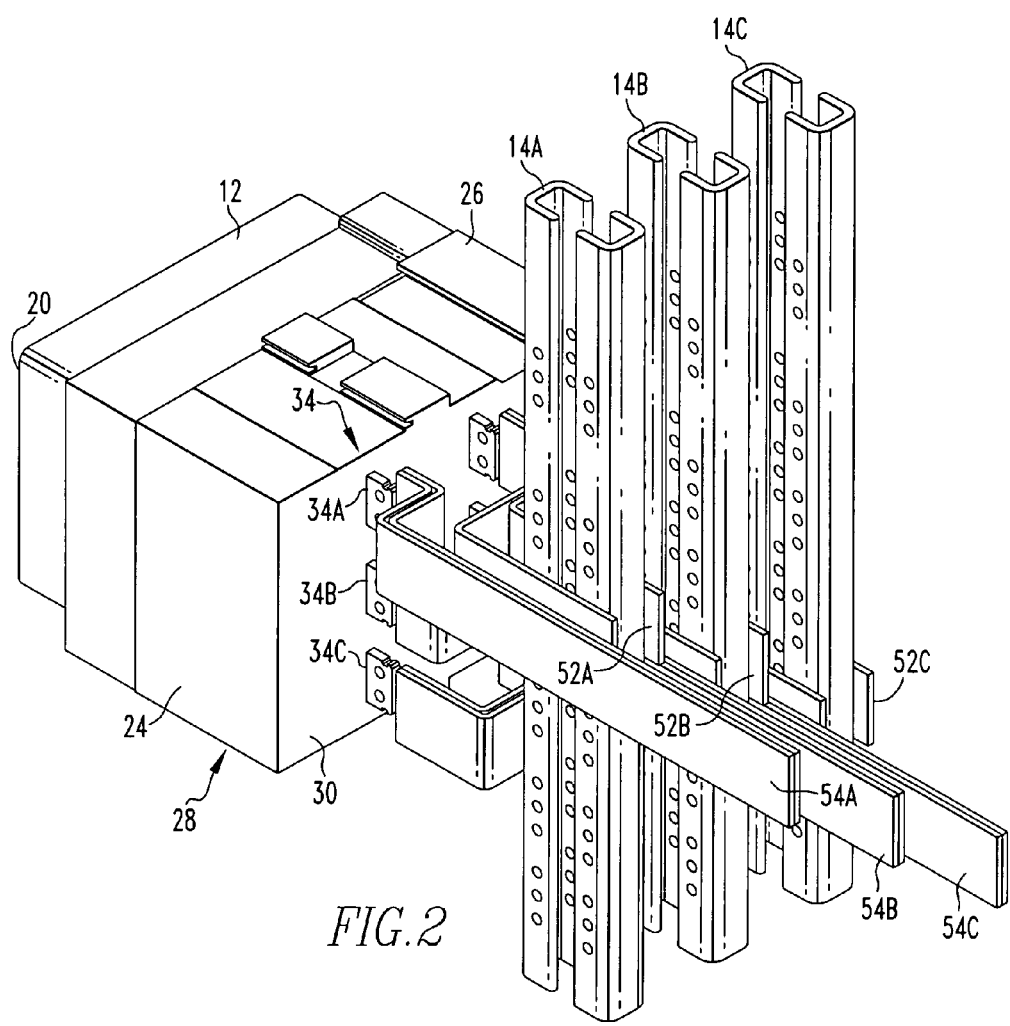
FIG. 2 is an isometric view of a single low voltage power switch gear circuit breaker in a power distribution center.
Figure 4:
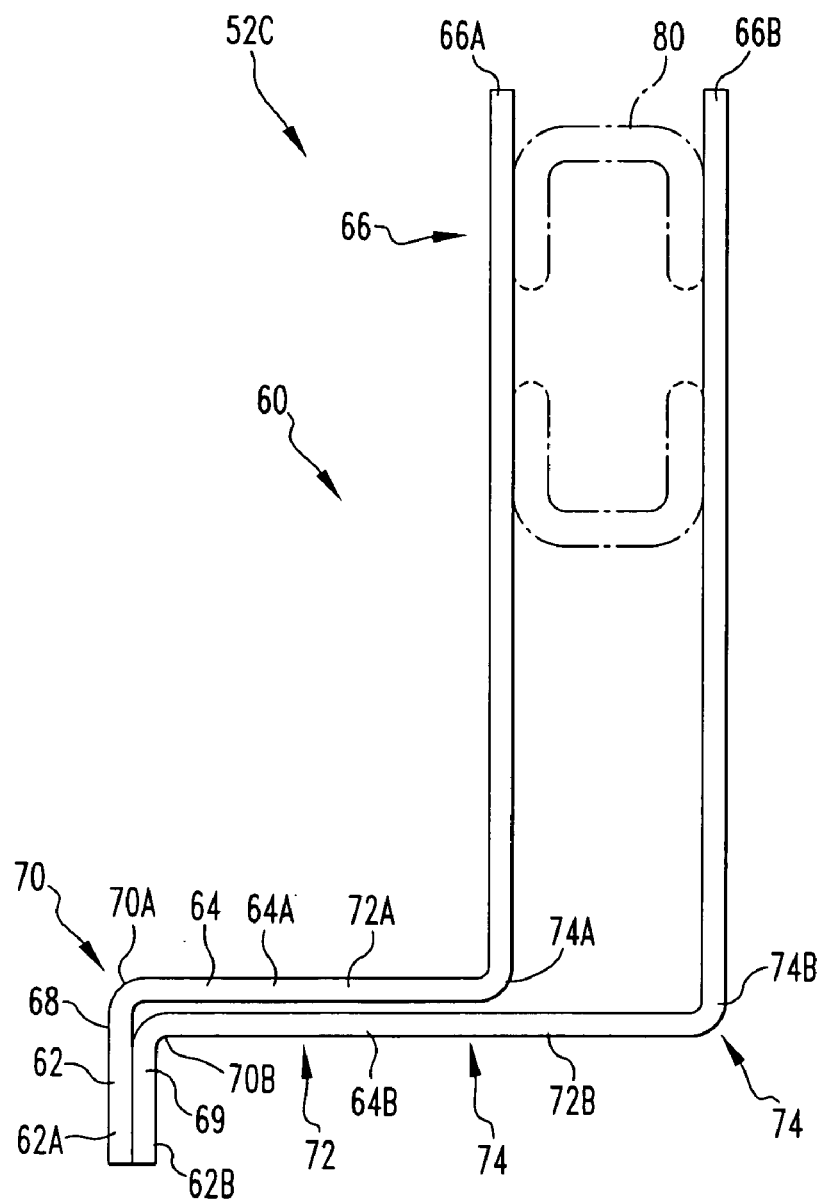
FIG. 4 detailed top view of a single line bus.

At least one line bus 52A, 52B, 52C has a horizontal offset, and, where there are three poles as shown, at least two line buses 52A, 52B, 52C have a horizontal offset. In the embodiment shown in FIGS. 1 and 2, the vertical line conductors 14A, 14B, 14C are shown as bifurcated tubular members 80 having a width. The middle vertical line conductor 14B is aligned with the line terminals 32A, 32B, 32C. Thus, the two outer line buses 52A, 52C each have an offset. That is, as shown in FIG. 4 (which only shows a single line bus 52C but which is applicable to any bus with an offset), the medial portion 64 of each of the outer line bus 52C has a first generally right angle bend 70 in a first direction, an offsetting length 72, and a second generally right angle bend 74 in a direction opposite said first generally right angle bend 70. Where the medial portion 64 has two generally right angle bends 72, 74 in opposite directions, each conductor end 66 extends in a plane generally parallel to, but offset from, the terminal end 62. Preferably, the length of the offsetting length 72 is between about 2.5 and 7.5 inches, and more preferably about 5.0 inches. Thus, each terminal end 62 of a line bus 52A, 52B, 52C is disposed adjacent to a vertical line conductor 14A, 14B, 14C. As described in more detail below, in one embodiment, the line buses 52A, 52B, 52C have two associated thin members 68, 69 that are structured to sandwich the vertical line conductors 14A, 14B, 14C and, as such, even the medial portion 64 of the middle line bus 52B includes a slight offset.

Figure 5:
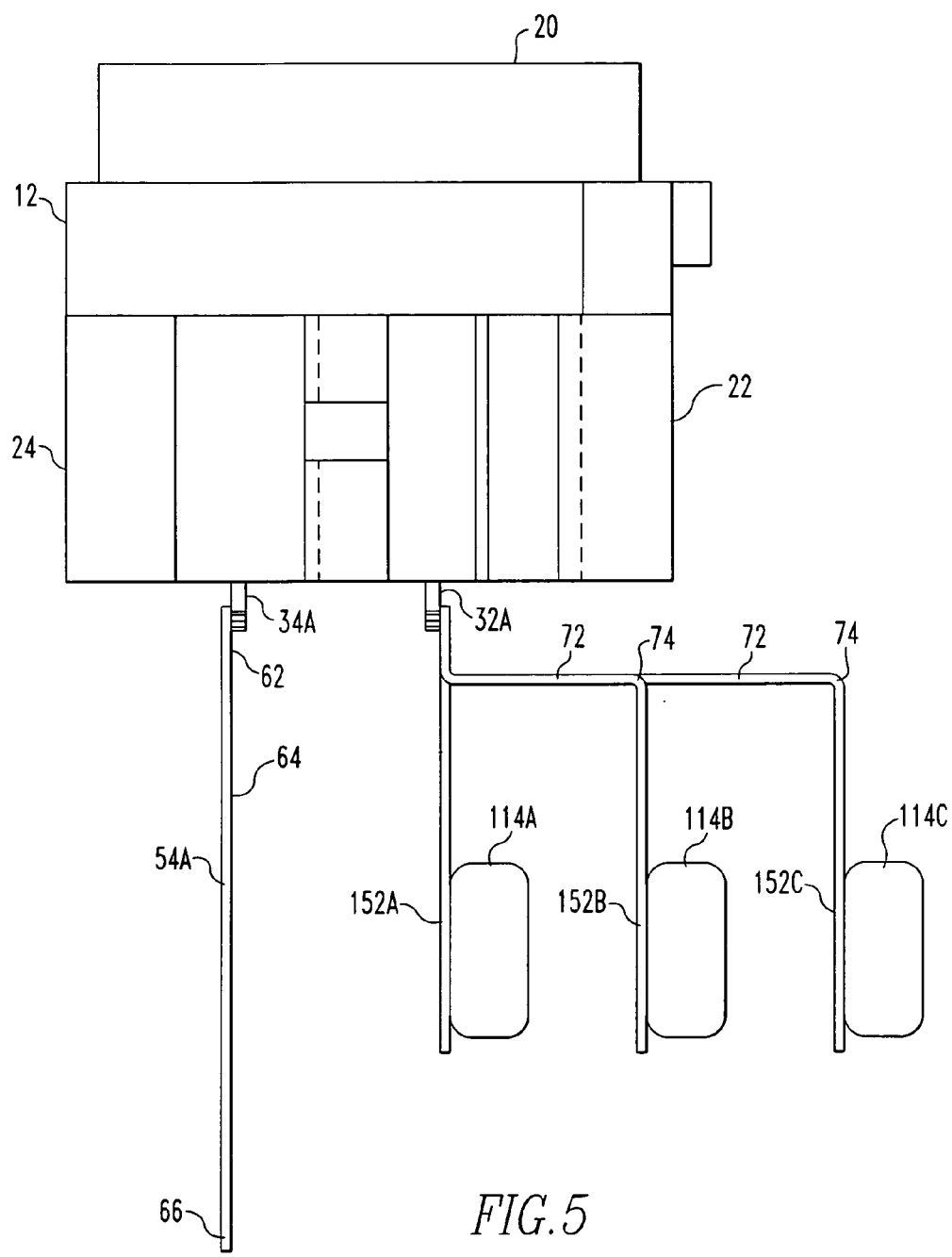
FIG. 5 is a top view of an alternate power distribution center.

However, in another embodiment, shown in FIG. 5, the vertical line conductors 114A, 114B, 114C are solid members wherein an outer vertical line conductor 114A is aligned with the line terminals 32A, 32B, 32C. In this embodiment, there are also three line buses 152A, 152B, 152C. The line bus 152A, extends between a line terminal 32A, 32B, 32C and the outer vertical line conductor 114A aligned with the line terminals 32A, 32B, 32C, and is generally straight. The medial portion 64 of each of the middle line bus 152B and the other outer line bus 152C each have a first generally right angle bend 70 in a first direction, an offsetting length 72, and a second generally right angle bend 74 in a direction opposite said first generally right angle bend 70. In this embodiment, the offsetting length 72 on one line bus 152A, 152B, 152C is between about 4.0 and 6.0 inches, and the offsetting length 72 on the other line bus 152A, 152B, 152C is between about 6.5 and 8.5 inches. More preferably, the offsetting length 72 on one line bus 152A, 152B, 152C is about 5.0 inches, and the offsetting length 72 on the other line bus 152A, 152B, 152C is about 7.5 inches.

Thus, in either embodiment, at least one line bus 52A, 52B, 52C, 152A, 152B, 152C is structured to extend between, and electrically couple, a line terminal 32A, 32B, 32C to a vertical line conductor 14A, 14B, 14C aligned with the circuit breaker line terminals 32A, 32B, 32C and at least one line bus 52A, 52B, 52C, 152A, 152B, 152C has a horizontal offset structured to extend between, and electrically couple, a line terminal 32A, 32B, 32C to at least one vertical line conductor 14A, 14B, 14C that is not aligned with the circuit breaker line terminals 32A, 32B, 32C.

The load buses 54A, 54B, 54C extend in a direction generally parallel to the load terminals. As shown in FIG. 5, in one embodiment, where the vertical line conductors 14A, 14B, 14C are offset from the load terminals 34A, 34B, 34C, the load buses 54A, 54B, 54C extend generally horizontally straight back from the load terminals 34A, 34B, 34C. In another embodiment, shown in FIGS. 1 and 2, the load buses 54A, 54B, 54C may include an offset structured to allow the load buses 54A, 54B, 54C to extend past the vertical line conductors 14A, 14B, 14C. That is, similar to the offset in the line buses 52A, 52B, 52C, each load bus 54A, 54B, 54C medial portion 64 has a first generally right angle bend 70 in a first direction, an offsetting length 72, and a second generally right angle bend 74 in a direction opposite said first generally right angle bend 70. Thus, each load bus 54A, 54B, 54C conductor end 66 extends in a plane generally parallel to, but offset from, the terminal end 62.

Figure 6:
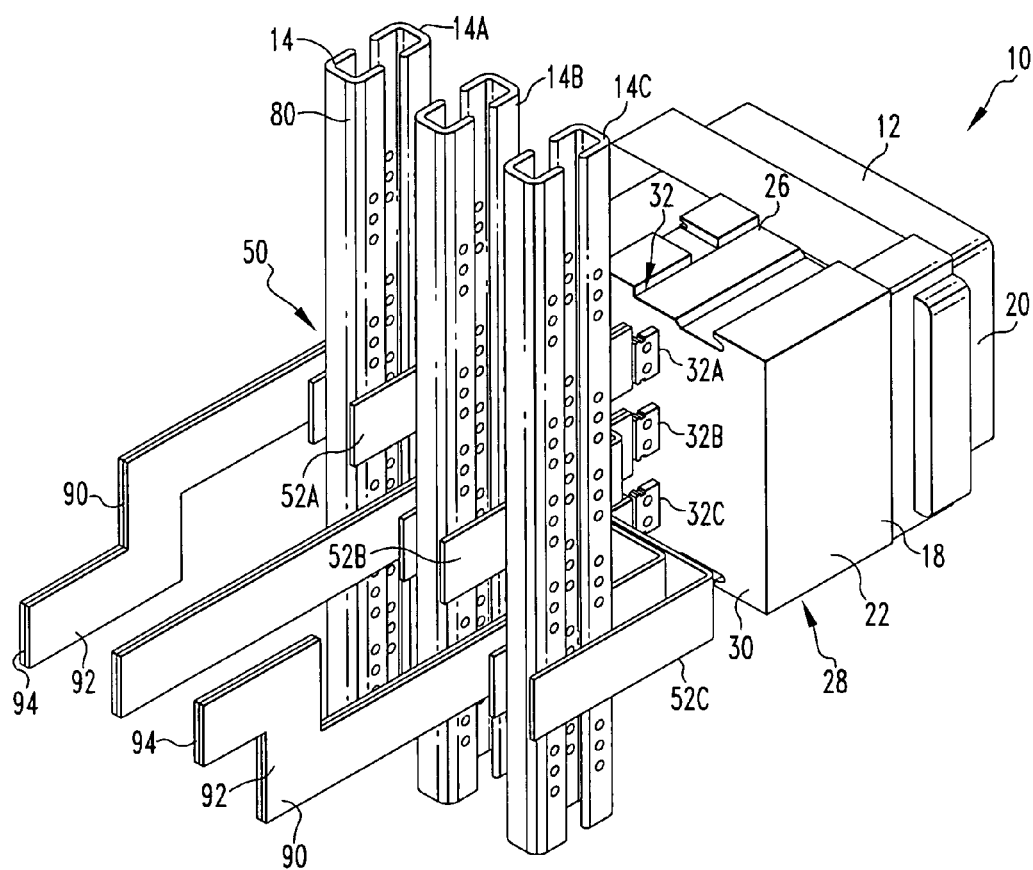
FIG. 6 is an isometric view of an alternate power distribution center.

As shown in FIG. 6, in an alternate embodiment, at least one, and preferably two, of the load buses 54A, 54B, 54C includes a vertical offset portion 90. The vertical offset portion 90 is structured to bring the conductor end 66 of each load bus 54A, 54B, 54C into the same general horizontal plane. That is, the vertical offset portion 90 is an L-shaped extension 92 having a distal end 94 that is horizontally aligned with the conductor end 66 of another load bus 54A, 54B, 54C.

As noted above, the vertical line conductors 14A, 14B, 14C may be tubular members 80 having a width of about two inches and opposing sides. Preferably, the conductive assembly 60 is structured to sandwich, that is, have a member on both sides of, the tubular members 80. As shown by example in FIG. 4, this is accomplished by having each conductive assembly 60 composed from two associated thin members, a first thin member 68 and a second thin member 69. Similar to the conductive assembly 60, each thin member 68, 69, respectively, includes a terminal end 62A, 62B, a medial portion 64A, 64B and a conductor end 66A, 66B. The thin member terminal ends 62A, 62B are joined and structure to be coupled to a line terminal 32A, 32B, 32C. The first thin member medial portion 64A has a generally right angle bend 70A in a first direction, a first offsetting length 72A, and a second generally right angle bend 74A in a direction opposite the first generally right angle bend 70A. The second thin member medial portion 64B has a generally right angle bend 70B in a first direction, a second offsetting length 72B, and a second generally right angle bend 74B in a direction opposite the first generally right angle bend 70B. The first offsetting length 72A and the second offsetting length 72B have a difference in length which is about the width of the tubular vertical line conductors 14A, 14B, 14C. In this configuration, an associated pair of thin member conductor ends 66A, 66B are disposed on opposite sides of a tubular vertical line conductor 14A, 14B, 14C. For example, where the centerline of a tubular vertical line conductor 14A, 14B, 14C is offset about 5.0 inches from the a line terminals 32A, 32B, 32C, the first offsetting length 72A is about 4.0 inches and the second offsetting length 72B is about 6.0 inches. These lengths are exemplary only and the first offsetting length 72A and the second offsetting length 72B may be adapted according to the spacing between, and the width of, the tubular vertical line conductors 14A, 14B, 14C.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A bus assembly structured to be coupled to a multiple pole circuit breaker and to a plurality of horizontally aligned vertical line conductors, said circuit breaker having a back side with a line terminal and a load terminal for each pole extending rearward therefrom, and wherein at least two terminals associated with different poles are vertically aligned, said bus assembly comprising:

a first set of line buses structured to be coupled to said line terminals and including at least one line bus having a horizontal offset; and a second set of load buses structured to be coupled to said load terminals and extending in a direction generally parallel to said load terminals.

2. The bus assembly of claim 1 wherein at least one vertical line conductor is aligned with said circuit breaker line terminals and at least one vertical line conductor is not aligned with said circuit breaker line terminals, and wherein:

each bus assembly in said first set of line buses is a conductive assembly having a terminal end, a medial portion and a conductor end;

wherein said at least one line bus having a horizontal offset has a medial portion with a first generally right angle bend in a first direction, an offsetting length, and a second generally right angle bend in a direction opposite said first generally right angle bend so that said conductor end extends in a plane generally parallel to, but offset from, the terminal end; and wherein one said line bus is structured to extend between, and electrically couple, a line terminal to said vertical line conductor aligned with said circuit breaker line terminals and said at least one line bus having a horizontal offset is structured to extend between, and electrically couple, a line terminal to said at least one vertical line conductor that is not aligned with said circuit breaker line terminals.

3. The bus assembly of claim 2 wherein said offsetting length is between about 2.5 and 7.5 inches.

4. The bus assembly of claim 2 wherein said offsetting length is about 5.0 inches.

5. The bus assembly of claim 1 wherein said circuit breaker is a three pole circuit breaker having a first pole, a second pole and a third pole, said first pole line terminal and load terminal are horizontally aligned, said second pole line terminal and load terminal are horizontally aligned, said third pole line terminal and load terminal are horizontally aligned, said first pole line terminal, said second pole line terminal and said third pole line terminal are vertically aligned, and said first pole load terminal, said second pole load terminal and said third pole load terminal are vertically aligned; and wherein said first set of line buses includes three line buses and two of said line buses have a horizontal offset.

6. The bus assembly of claim 5 wherein said plurality of vertical conductors includes three vertical conductors, one vertical line conductor is aligned with said circuit breaker line terminals and the remaining two vertical line conductors are not aligned with said circuit breaker line terminals; and wherein each bus assembly in said first set of line buses is a conductive assembly having a terminal end, a medial portion and a conductor end;

wherein each of said two line buses having a horizontal offset has a medial portion with a first generally right angle bend in a first direction, an offsetting length, and a second generally right angle bend in a direction opposite said first generally right angle bend so that said conductor end extends in a plane generally parallel to, but offset from, the terminal end; and wherein one said line bus is structured to extend between, and electrically couple, a line terminal to said vertical line conductor aligned with said circuit breaker line terminals and each of said two line buses having a horizontal offset is structured to extend between, and electrically couple, a line terminal to one of said vertical line conductors that are not aligned with said circuit breaker line terminals.

7. The bus assembly of claim 6 wherein:

the offsetting length on one line bus is between about 4.0 and 6.0 inches; and the offsetting length on the other line bus is between about 6.5 and 8.5 inches.

8. The bus assembly of claim 6 wherein:
the offsetting length on one line bus is about 5.0 inches; and
the offsetting length on the other line bus is about 7.5 inches.

9. The bus assembly of claim 6 wherein said vertical line conductors are tubular members having a width with opposing sides:
each said conductive assembly includes two associated thin members, a first member and a second member;
said thin members each having a terminal end, a medial portion, and a conductor end;
each said conductive assembly associated thin members being joined at said terminal ends;
each said conductive assembly first thin member medial portion having a generally right angle bend in a first direction, a first offsetting length, and a second generally right angle bend in a direction opposite said first generally right angle bend;
each said conductive assembly second thin member medial portion having a generally right angle bend in a first direction, a second offsetting length, and a second generally right angle bend in a direction opposite said first generally right angle bend; and
wherein said first offsetting length and said second offsetting length have a difference in length of about the width of the tubular vertical line conductor so that an associated pair of thin member conductive ends are disposed on opposite sides of said tubular vertical line conductor.

10. The bus assembly of claim 1 wherein at least one of said second set of load buses includes an L-shaped extension having a distal end wherein said distal end is in the same generally horizontal plane as another one of said second set of load buses.

11. A power distribution center comprising:
a plurality of vertical line conductors;
a first multiple pole circuit breaker having a back side with a line terminal and a load terminal for each pole extending therefrom, and wherein at least two terminals associated with different poles being vertically aligned,
a second multiple pole circuit breaker having a back side with a line terminal and a load terminal for each pole extending therefrom, and wherein at least two terminals associated with different poles being vertically aligned;
said at least one terminal on said first multiple pole circuit breaker and at least one terminal on said second multiple pole circuit breaker being vertically aligned;
a bus assembly associated with each said circuit breaker, each bus assembly having a first set of line buses and a second set of load buses;
each said first set of load buses having one bus coupled to, and extending between, each said line terminals and a vertical conductor, wherein at least one line bus has a horizontal offset; and
each said second set of load buses structured to be coupled to said load terminals and extending in a direction generally parallel to said load terminals.

12. The power distribution center of claim 11 wherein:
at least one vertical line conductor is aligned with said first and second circuit breaker line terminals and at least one vertical line conductor is not aligned with said first and second circuit breaker line terminals;
each bus assembly in each said first set of line buses is a conductive assembly having a terminal end, a medial portion and a conductor end;
wherein each said at least one line bus having a horizontal offset has a medial portion with a first generally right angle bend in a first direction, an offsetting length, and a second generally right angle bend in a direction opposite said first generally right angle bend so that each said conductor end extends in a plane generally parallel to, but offset from, each said terminal end; and
wherein one said line bus in each bus assembly is structured to extend between, and electrically couple, a line terminal to said vertical line conductor aligned with said first and second circuit breaker line terminals and said at least one line bus having a horizontal offset in each bus assembly is structured to extend between, and electrically couple, a line terminal to said at least one vertical line conductor that is not aligned with said circuit breaker line terminals.

13. The power distribution center of claim 12 wherein said offsetting length is between about 2.5 and 7.5 inches.

14. The power distribution center of claim 12 wherein said offsetting length is about 5.0 inches.

15. The power distribution center of claim 11 wherein:
said first and second circuit breakers are three pole circuit breakers having a first pole, a second pole and a third pole, said first pole line terminal and load terminal are horizontally aligned, said second pole line terminal and load terminal are horizontally aligned, said third pole line terminal and load terminal are horizontally aligned, said first pole line terminal, said second pole line terminal and said third pole line terminal are vertically aligned, and said first pole load terminal, said second pole load terminal and said third pole load terminal are vertically aligned; and
each said bus assembly first set of line buses includes three line buses and two of said line buses have a horizontal offset.

16. The power distribution center of claim 15 wherein:
said plurality of vertical conductors includes three vertical conductors, one vertical line conductor being aligned with one of said first and second circuit breaker line terminals and the remaining two vertical line conductors are not aligned with said first and second circuit breaker line terminals;
each bus assembly in each said first set of line buses is a conductive assembly having a terminal end, a medial portion and a conductor end;
wherein each of said line buses having a horizontal offset has a medial portion with a first generally right angle bend in a first direction, an offsetting length, and a second generally right angle bend in a direction opposite said first generally right angle bend so that said conductor end extends in a plane generally parallel to, but offset from, the terminal end; and
wherein in each bus assembly, one said line bus extends between, and electrically couples, a line terminal to said vertical line conductor aligned with said first and second circuit breaker line terminals and each of said two line buses having a horizontal offset extends between, and electrically couples, a line terminal to one of said vertical line conductors that are not aligned with said first and second circuit breaker line terminals.

17. The power distribution center of claim 16 wherein:
the offsetting length on one line bus is between about 4.0 and 6.0 inches; and
the offsetting length on the other line bus is between about 6.5 and 8.5 inches.

18. The power distribution center of claim 16 wherein:
the offsetting length on one line bus is about 5.0 inches; and
the offsetting length on the other line bus is about 7.5 inches.

19. The power distribution center of claim 16 wherein:
said vertical line conductors are tubular members having a width with opposing sides:
each said conductive assembly includes two associated thin members, a first member and a second member;
said thin members each having a terminal end, a medial portion, and a conductor end;
each said conductive assembly associated thin members being joined at said terminal ends;
each said conductive assembly first thin member medial portion having a generally right angle bend in a first direction, a first offsetting length, and a second generally right angle bend in a direction opposite said first generally right angle bend;
each said conductive assembly second thin member medial portion having a generally right angle bend in a first direction, a second offsetting length, and a second generally right angle bend in a direction opposite said first generally right angle bend; and
wherein said first offsetting length and said second offsetting length have a difference in length of about the width of the tubular vertical line conductor so that an associated pair of thin member conductive ends are disposed on opposite sides of said tubular vertical line conductor.

20. The power distribution center of claim 11 wherein at least one of said second set of load buses includes an L-shaped extension having a distal end wherein said distal end is in the same generally horizontal plane as another one of said second set of load buses.

* * * * *